United States Patent Office 3,636,104
Patented Jan. 18, 1972

3,636,104
PROCESS FOR PREPARING
N,N'-DIARYLTHIOUREAS
Ehrenfried H. Kober, Hamden, Conn., and Gerhard F. Ottmann, Wuppertal-Elberfeld, Germany, assignors to Olin Mathieson Chemical Corporation, New Haven, Conn.
No Drawing. Filed Oct. 29, 1968, Ser. No. 771,616
Int. Cl. C07c *157/00*
U.S. Cl. 260—552 R    25 Claims

ABSTRACT OF THE DISCLOSURE

The process for preparing N,N'-diarylthioureas by reacting:
(a) carbon disulfide and/or carbonyl sulfide,
(b) water,
(c) a compound selected from the group consisting of
   (1) an aromatic nitro compound,
   (2) an aromatic nitroso compound,
   (3) and mixtures of (1) and (2),
(d) and a base,
and recovering the N,N'-diarylthioureas produced thereby.

---

This invention relates to a process for preparing N,N'-diarylthioureas from aromatic nitro compound.

N,N'-diarylthioureas, having the structural formula:

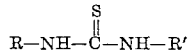

where R and R' are each an aryl moiety containing between 6 and about 16 carbon atoms, are used extensively as bactericides and pesticides. For example, antitubercolosis activity of p-substituted N,N'-diarylthioureas is disclosed in U.S. Pat. 2,760,976, issued Aug. 28, 1956, by Charles F. Huebner et al., and larvicidal activity of N,N'-diarylthioureas has been described in Bull. Research Council, Israel, 7A, 135–7 (1958).

Previously, N,N'-diarylthioureas have been prepared by reacting aromatic amines, e.g. aniline, with carbon disulfide in pyridine or alcohol with the addition of sulfur or hydrogen peroxide. These thioureas are also formed by the addition of aromatic amines, e.g., aniline, to an aromatic isothiocyanate or the addition of hydrogen sulfide to diaryl carbodiimides. Also the reaction of anilines with thiophosgene affords these products. All of the aforementioned techniques for preparing N,N'-diarylthioureas utilize aromatic primary amines as starting materials. These primary amines usually have to be prepared from the corresponding nitro compounds.

There is a need at the present time for a more simplified technique for preparing N,N'-diarylthioureas, i.e., the direct conversion of aromatic nitro compounds to the N,N'-diarylthioureas in one step.

It is an object of this invention to overcome deficiencies in previously known techniques for preparing N,N'-diarylthioureas.

Another object of the invention is to provide an improved process for preparing N,N'-diarylthioureas.

More specifically, it is a purpose of this invention to provide an improved process for preparing N,N'-diarylthioureas directly from aromatic nitro compounds in one step.

Still more particularly, it is an object of this invention to provide an improved one-step technique for preparing N,N'-diphenylthiourea.

These and other objects of the invention will be apparent from the following detailed description.

It has now been discovered that the foregoing objects are accomplished when water and carbon disulfide and/or carbonyl sulfide are reacted with an aromatic nitrogen compound selected from the group consisting of an aromatic nitro compound, an aromatic nitroso compound, and mixtures thereof, in the presence of a base, and the resulting N,N'-diarylthiourea is recovered from the reaction mixture.

More in detail, the aromatic nitro compound reactant may be at least one of a wide variety of aromatic nitro compounds. As used herein, the term "aromatic nitro compound" represents those organic compounds having at least one nitro group attached directly to an aromatic hydrocarbon nucleus such as benzene, naphthalene, anthracene, phenanthrene and the like. The aromatic hydrocarbon nucleus may also contain other ring substituents in addition to the nitro groups. Thus the term "aromatic nitro compound" as used herein also represents aromatic hydrocarbons having one nitro substituent and one or more other substituents such as nitro, alkyl, aryl, aralkyl, alkoxy, aryloxy, alkylmercapto, arylmercapto, halogen, cyano, and the like on the aromatic hydrocarbon moiety. In general, these additional ring substituents do not inhibit completely the reaction of carbon disulfide or carbonyl sulfide with the nitro groups under the conditions of the process disclosed herein. Carbon disulfide or carbonyl sulfide may also react with some of these additional ring substituents concurrently with the reaction of the nitro groups, and some of these substituents may impede or retard the desired reaction of $CS_2$ or COS with the nitro groups as for instance by introducing a steric hindrance factor; but invariably some formation of N,N'-diarylthiourea occurs by the process albeit at a reduced rate or in lower yield.

Thus among the aromatic nitro compounds which may be used as reactants in the practice of this invention are the various nitrobenzenes, nitronaphthalenes and nitroanthracenes. Also included as useful reactants are the various nitrobiphenyls, nitrotoluenes, nitroxylenes, nitromesitylenes, nitrodiphenyl alkanes, alkoxynitrobenzenes, nitrodiphenyl ethers, nitropolyphenyl ethers, alkylmercapto nitrobenzenes, nitrodiphenyl thioethers, nitrobenzonitriles, and aromatic nitrohalocarbons.

Illustrative of specific aromatic nitro compounds useful as reactants are: nitrobenzene, o-dinitrobenzene, m-dinitrobenzene, p-dinitrobenzene, 1,3,5-trinitrobenzene, 1-nitronaphthalene, 2-nitronaphthalene, o-nitrotoluene, m-nitrotoluene, p-nitrotoluene, 2,4-dinitrotoluene, 2,6-dinitrotoluene, o-nitro-p-xylene, 2-methyl-1-nitronaphthalene, dinitromesitylene, o-nitrobiphenyl, m-nitrobiphenyl, p-nitrobiphenyl, 4,4'-dinitrobiphenyl, 2,4-dinitrobiphenyl, bis(p-nitrophenyl)methane, o-nitroanisole, m-nitroanisole, p-nitroanisole, 2,4-dinitroanisole, o-nitrophenetole, p-nitrophenetole, and 2,4-dinitrophenetole.

Similarly:

o-nitrophenyl phenyl ether,
m-nitrophenyl phenyl ether,
p-nitrophenyl phenyl ether,
bis(2,4-dinitrophenyl)-ether,
bis(p-nitrophenyl)ether,
o-nitrophenyl phenyl thioether,
m-nitrophenyl phenyl thioether,
p-nitrophenyl phenyl thioether,
bis(p-nitrophenyl)thioether,
o-nitrophenyl methyl thioether,
bis(p-nitrophenoxy)ethane,
1-chloro-2-nitrobenzene,
1-bromo-2-nitrobenzene,
1-chloro-3-nitrobenzene,
1-bromo-3-nitrobenzene,
1-chloro-4-nitrobenzene,
1-bromo-4-nitrobenzene,
1-fluoro-4-nitrobenzene, 2-chloro-6-nitrotoluene,
2-bromo-6-nitrotoluene,
2-fluoro-6-nitrotoluene,
4-chloro-3-nitrotoluene,
1-chloro-2,4-dinitrobenzene,
1-bromo-2,4-dinitrobenzene,
1-fluoro-2,4-dinitrobenzene,
1,4-dichloro-2-nitrobenzene,
1,4-difluoro-2-nitrobenzene,
1,3,5-trichloro-2-nitrobenzene,
1,3,5-tribromo-2-nitrobenzene,
1,2-dichloro-4-nitrobenzene,
1,2,4-trichloro-5-nitrobenzene,
o-nitrophenyl isocyanate,
m-nitrophenyl isocyanate,
p-nitrophenyl isocyanate,
1-chloro-2,4-dimethoxy-5-nitrobenzene,
1,4-dimethoxy-2-nitrobenzene,
o-nitrobenzonitrile,
m-nitrobenzonitrile,
p-nitrobenzonitrile,
3,3'-dimethoxy-4,4'-dinitrobiphenyl, and
3,3'-dimethyl-4,4'-dinitrobiphenyl may be employed as starting reactants.

Isomers and mixtures of the aforesaid aromatic nitro compounds and substituted aromatic nitro compounds may also be utilized in the practice of this invention as well as homologues and other related compounds. Generally, the starting nitro compound reactants contain between 6 and about 16, and preferably below about 14 carbon atoms. Compounds which have both nitro and isothiocyanato substituents may also be employed as reactants.

While the process is generally applicable to the conversion of any of the aforementioned aromatic nitro compounds to N,N'-diarylthioureas, include among the preferred reactants to be utilized in this invention are the nitrobenzenes, both mono- and polynitro, including isomeric mixtures thereof; the alkylnitrobenzenes, including the various nitrated toluenes and the nitrated xylenes; the alkoxynitrobenzenes; the nitrated mono-, di-, and trichlorobenzenes and toluenes; nitrated biphenyl and nitrated diphenylmethane. Other preferred reactants which can be particularly mentioned include the nitrodiphenyl ethers, the bis-(nitrophenoxy)alkanes, and the bis(nitrophenyl)sulfides.

Aromatic nitroso compounds, aromatic azo compounds and aromatic azoxy compounds are also converted to N,N'-diarylthioureas in accordance with this invention. As described in the preceding discussion relating to suitable aromatic nitro compound reactants, the aromatic nitroso, aromatic azo and aromatic azoxy compounds may also contain one or more other substituent on the aromatic ring in addition to the reactive nitroso, azo, or azoxy groups.

The reaction of the aromatic nitro compound with carbon disulfide and/or carbonyl sulfide and water is carried out in the presence of a basic material. The function of the base in the reaction mixture is not definitely known, but for purposes of simplicity in the description of the invention it will be referred to as a "catalyst." Basic compounds useful as a catalyst in this reaction include compounds having the formula MeXR where Me is an alkali metal such as sodium, lithium and potassium, X is oxygen or sulfur and R is hydrogen, alkyl, substituted alkyl, aryl and substituted aryl. The alkyl moiety may contain between 1 and about 10 carbon atoms, such as methyl, ethyl, propyl and the like up through decyl. The aryl moiety and substituted aryl moiety is the same as those described above with respect to the aromatic and substituted aromatic nitro compounds. Substituents on the alkyl moiety may be the same as those described above with respect to the substituted aromatic nitro compounds.

Typical bases of this type include, for example, alkali metal hydroxides, such as sodium hydroxide, potassium hydroxide, lithium hydroxide; alkali metal alkoxides, such as sodium methoxide, potassium ethoxide, potassium tertiary butoxide, lithium propoxide, alkali metal salts of phenols such as sodium phenoxide and the like, alkali metal hydrosulfides, such as sodium hydrosulfide, potassium hydrosulfide; alkali metal mercaptides such as sodium methylmercaptide, potassium methylmercaptide, sodium ethylmercaptide; and alkali metal thiophenolates such as sodium thiophenoxide and the like. Other suitable basic materials include alkali metal carbonates such as sodium carbonate, potassium carbonate and lithium carbonate; and include also nitrogen-containing bases such as ammonia, ammonium hydroxide, organic amines such as triethyl amine or triphenyl amine, and the like. Mixtures of the above-mentioned bases may be used if desired. The proportion of base added to the reaction may be varied over a wide range, but is generally in the range between about 0.01 and about 10 moles, and preferably in the range between about 0.1 and about 3 moles of base per mole of nitro groups present in the starting aromatic nitro compound.

The proportion of water added to the reaction mixture is generally between about 0.05 and about 20, and preferably between about 0.1 and about 15 moles of water per mole of nitro groups in the aromatic nitro compound.

In carrying out the process of this invention, the aromatic nitro compound, water and base are placed in a suitable pressure vessel, such as an autoclave, which is equipped with a gas sparger for feeding gas or liquid into the bottom thereof. The pressure vessel is also optionally provided with agitation means as well as cooling and heating means. After the slurry or solution of catalyst and aromatic nitro compound is placed into the pressure vessel, it is sealed, and carbon disulfide and/or carbonyl sulfide is pumped into the pressure vessel through the gas sparger until the desired pressure is obtained under the temperature conditions employed. Preferably, the desired amount of carbon disulfide and/or carbonyl sulfide might be added as a liquid, before the pressure vessel is closed. For convenience, the term "sulfur compound of carbon" will be used throughout the description and claims to include carbon disulfide, carbonyl sulfide, or mixtures thereof in any ratio.

After the desired temperature and pressure conditions are obtained, the sulfur compound of carbon may be fed continuously through the sparger into the suspension of catalyst and aromatic nitro compound during the entire reaction period while maintaining the pressure at the desired level.

The order of mixing the reactants is not critical and may be varied within the limitations of the equipment employed. In one embodiment, the aromatic nitro compound, water, base, sulfur compound of carbon in liquid form and, if desired, solvent, are charged to a suitable pressure vessel such as an autoclave which was previously purged with nitrogen, and which is preferably provided with agitation means such as a stirrer or an external rocking mechanism. The operating pressure can be attained by heating and/or by feeding the sulfur compound of carbon into the autoclave. The operating pressure after heating or after feeding the sulfur compound of carbon into the closed autoclave is in the range between about 30 and about 10,000 p.s.i.g., and preferably between about 100 and about 2000 p.s.i.g., but greater or lesser pressures may be employed if desired.

Generally, the quantity of the sulfur compound of carbon in the free space of the reactor is maintained at a level sufficient to maintain the desired pressure as well as to provide reactant for the process, as the reaction progresses. If desired, additional sulfur compound of carbon can be fed to the reactor either intermittently or continuously as the reaction progresses to maintain the pressure within the above range. The total amount of sulfur compound of carbon added is generally between about 0.1 and about 50, and preferably between about 0.5 and about 25 moles of sulfur compound of carbon per mole of nitro groups in the aromatic nitro compound. Greater or lesser amounts may be employed if desired. The highest sulfur compound of carbon requirements are generally utilized in a process in which the gas is added continuously, but suitable recycle of the gas stream greatly reduces the overall consumption of the sulfur compound of carbon.

The reaction between the sulfur compound of carbon and aromatic nitro compound may be effected in the absence of a solvent, but N,N'-diarylthioureas can also be obtained when a solvent which is chemically inert to the components of the reaction system is employed. Suitable solvents include aliphatic, cycloaliphatic, aromatic solvents such as n-heptane, cyclohexane, benzene, toluene, xylene, dioxane, and acetone and halogenated aliphatic and aromatic hydrocarbons such as dichloromethane, trichloroethylene, perchloroethylene, tetrachloroethane, monochlorobenzene, dichlorobenzene, chloronaphthalene, mixtures thereof and the like.

The proportion of solvent is not critical and any proportion may be employed which will not require excessively large equipment to contain. Generally the weight percent of aromatic nitrogen compound reactant, such as the aromatic nitro compound, in the solvent is in the range between about 2.0 and about 75 percent, but greater or lesser proportions may be employed if desired.

For purposes of convenience, the proportions of base, water, and sulfur compound of carbon, have been presented in terms of moles per mole of nitro groups in the aromatic nitro compound. When the reactant is an aromatic nitroso compound, aromatic azo compound or aromatic azoxy compound, the molar proportion of base, water and sulfur compound of carbon will be the same as stated above per mole of nitro group, azo group, or azoxy group, as the case may be.

The reaction temperature is maintained above about 25° C. and preferably between about 100 and about 250° C. Interior and/or exterior heating and cooling means may be employed to maintain the temperature within the reactor within the desired range.

The reaction time is dependent upon the aromatic nitro compound being reacted, on the catalyst and on the amount of catalyst being charged, as well as the type of equipment being employed. Usually between one-half hour and 20 hours are required to obtain the desired degree of reaction in a batch operation, but shorter or longer reaction times may be employed. In a continuous process, the reaction time may be much lower, i.e., substantially instantaneous and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the N,N'-diarylthioureas from the reaction product. However, other suitable separation techniques such as extraction, sublimation, etc., may be employed to separate the N,N'-diarylthioureas from the unreacted aromatic nitro compound and any by-products that may be formed.

The N,N'-diarylthioureas produced in accordance with the technique of this invention have the structural formula

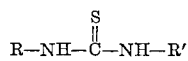

where R and R' are each an aryl containing between about 6 and about 16 carbon atoms. The R and R' moieties correspond to the aromatic and substituted aromatic moieties of the original aromatic and substituted aromatic compound used as a reactant. As indicated in the aromatic nitro compounds previously exemplified, R and R' may each be moieties such as benzene, xylene, biphenyl, napthlene, and the like.

Although all of the aforesaid bases are effective in forming N,N'-diarylthioureas from all of the aforesaid aromatic nitro compounds, the preferred bases are as follows:

(a) NaOH
(b) KOH
(c) $CH_3ONa$
(d) $C_6H_5ONa$
(e) NaSH
(f) $CH_3SNa$
(g) $C_6H_5SNa$
(h) $K_2CO_3$
(i) $Na_2CO_3$
(j) KSH
(k) $(CH_3)_3COK$ and
(l) mixtures thereof and the preferred aromatic nitro compounds are as follows:

(a) nitrobenzene
(b) 2-nitrotoluene
(c) 3-nitrotoluene
(d) 4-nitrotoluene
(e) paramethoxynitrobenzene
(f) 3-chloronitrobenzene
(g) and mixtures thereof.

The following examples are presented to describe the invention more fully without any intention of being limited thereby. All parts and percentages are by weight unless otherwise specified.

EXAMPLE 1

A 300 milliliter stainless steel autoclave provided with a mechanically driven agitator, internal cooling coil, and an external heating mantle was employed in this example. Nitrobenzene (50 grams, 0.4 mole), carbon disulfide (100 ml., 1.66 moles), water (25 ml., 1.4 moles) and sodium hydroxide (8.0 g., 0.2 mole) were charged to the autoclave. The autoclave and auxiliary equipment were assembled, the agitator was started, and heat was applied to raise the internal temperature to about 100° C. An exothermic reaction began which raised the temperature to about 160° C. The temperature was maintained in the range between about 160 and about 163° C. with cooling water passed through the internal coils. After the exothermic reaction ceased, the temperature was maintained at 155–160° C. for two additional hours. After this period, the reaction mixture was cooled by passing cooling water through the internal coils, and the pressure was released from the vessel. The reaction mixture was then removed from the autoclave, extracted with ether and the ether extract was then extracted with water to remove water soluble impurities. The remaining ether solution was concentrated to remove most of the ether. The crude N,N'-diphenylthiourea thus obtained was recrystallized from ethyl alcohol to afford 24.1 grams of pure product, having a melting point of 149.5° C. The corrected yield was 52 percent.

EXAMPLE 2

A 1000 ml. stirring autoclave was charged with 41.1 g. (0.3 mole) of m-nitrotoluene, 12 g. (0.3 mole) of sodium hydroxide, 150 ml. (1.2 moles) of carbon disulfide, and 50 ml. (2.8 moles) of water. The autoclave was closed and the stirred mixture was heated at 160° C. for 3 hours. The autoclave was then cooled, the reaction mixture removed from the autoclave and diluted with 300–400 ml. of ether, thoroughly shaken, filtered and the organic phase separated. The filter cake contained mostly elemental sulfur. The organic layer was concentrated to an oily liquid which crystallized to a hard cake of crude di-3-tolyl-thiourea which was purified to yield 26 grams of N,N'-di-3-tolylthiourea (yield: 67 percent of theory); melting point, 121° C.

EXAMPLES 3–18

Utilizing the same equipment, the same procedure, and reaction conditions similar to those described in Example 1, nitrobenzene and substituted nitrobenzenes were converted to the corresponding diarylthioureas by means of various bases, utilizing amounts of carbon disulfide and water, as indicated in the following table for Examples 3–18.

| Example | Nitro compound charged | Moles | Base charged | Moles | $CS_2$, moles | $H_2O$, moles | Yield of thiourea, percent |
|---|---|---|---|---|---|---|---|
| 3 | $C_6H_5NO_2$ | 0.3 | NaOH | 0.05 | 0.3 | 2.8 | 18 |
| 4 | $C_6H_5NO_2$ | 0.3 | NaOH | 0.6 | 1.0 | 2.8 | 32 |
| 5 | $C_6H_5NO_2$ | 0.3 | KOH | 0.3 | 1.5 | 0.28 | 24 |
| 6 | $C_6H_5NO_2$ | 0.3 | $K_2CO_3$ | 0.3 | 1.5 | 1.0 | 28 |
| 7 | $C_6H_5NO_2$ | 0.3 | $CH_3ONa$ | 0.4 | 2.0 | 1.0 | 48 |
| 8 | $C_6H_5NO_2$ | 0.3 | $C_6H_5ONa$ | 0.4 | 2.0 | 1.0 | 27 |
| 9 | $C_6H_5NO_2$ | 0.3 | NaSH | 0.3 | 2.0 | 1.0 | 21 |
| 10 | $C_6H_5NO_2$ | 0.3 | KSH | 0.2 | 2.0 | 1.0 | 31 |
| 11 | $C_6H_5NO_2$ | 0.3 | $CH_3SNa$ | 0.3 | 2.0 | 1.0 | 43 |
| 12 | $C_6H_5NO_2$ | 0.3 | $C_6H_5SNa$ | 0.3 | 2.0 | 1.0 | 60 |
| 13 | $C_6H_5NO_2$ | 0.3 | $(CH_3)_3COK$ | 0.5 | 2.0 | 1.0 | 50 |
| 14 | o-$CH_3C_6H_4NO_2$ | 0.3 | NaOH | 0.3 | 3.0 | 1.0 | 43 |
| 15 | m-$CH_3C_6H_4NO_2$ | 0.3 | NaOH | 0.3 | 4.0 | 1.0 | 62 |
| 16 | p-$CH_3C_6H_4NO_2$ | 0.3 | NaOH | 0.3 | 6.0 | 1.0 | 51 |
| 17 | p-$CH_3OC_6H_4NO_2$ | 0.3 | NaOH | 0.3 | 3.0 | 1.0 | 39 |
| 18 | m-$ClC_6H_4NO_2$ | 0.3 | NaOH | 0.3 | 3.0 | 1.0 | 59 |

Various modifications of the invention, some of which have been disclosed above, may be employed without departing from the spirit of the invention.

What is desired to be secured by Letters Patent is:

1. The process for preparing N,N'-diarylthioureas by reacting:
   (a) a sulfur-containing compound of carbon selected from the group consisting of:
      (1) carbon disulfide,
      (2) carbonyl sulfide,
      (3) mixtures of carbon disulfide, and carbonyl sulfide,
   (b) water,
   (c) an aromatic nitro compound containing between 6 and about 16 carbon atoms, said aromatic nitro compound being selected from the group consisting of:
      (1) aromatic nitro hydrocarbon compounds and
      (2) substituted aromatic nitro hydrocarbon compounds wherein the substituent is selected from the group consisting of:
         (a) alkoxy,
         (b) aryloxy,
         (c) alkylmercapto,
         (d) arylmercapto,
         (e) halogen, and
         (f) cyano
   (d) and a base having the formula: MeXR, wherein:
      (1) Me is an alkali metal
      (2) X is selected from the group consisting of oxygen and sulfur
      (3) R is a substituent selected from the group consisting of:
         (a) hydrogen,
         (b) alkyl,
         (c) substituted alkyl,
         (d) aryl, and
         (e) substituted aryl,
   (e) said alkyl and said substituted alkyl containing between 1 and 10 carbon atoms, said aryl and said substituted aryl containing between 6 and 16 carbon atoms, wherein the substituent is selected from the group consisting of:
      (1) alkoxy,
      (2) aryloxy,
      (3) alkylmercapto,
      (4) arylmercapto,
      (5) halogen, and
      (6) cyano,
   (f) the reaction being carried out at a pressure in the range of between about 30 and about 10,000 p.s.i.g., and
   (g) the reaction being carried out at a temperature of between about 100 and about 250° C.

2. The process of claim 1 wherein the molar proportion of base to said aromatic nitrogen-containing compound is in the range of between about 0.01 and about 10 moles of base per mole of nitrogen-containing groups in said aromatic nitrogen-containing compound.

3. The process of claim 2 wherein the molar proportion of water is in the range of between about 0.05 and about 20 moles of water per mole of nitrogen-containing groups in said aromatic nitrogen-containing compound.

4. The process of claim 3 wherein said base is an alkali metal carbonate.

5. The process of claim 3 wherein said base is selected from the group consisting of:
   (a) NaOH
   (b) KOH
   (c) $CH_3ONa$
   (d) $C_6H_5ONa$
   (e) NaSH
   (f) $CH_3SNa$
   (g) $C_5H_5SNa$
   (h) $K_2CO_3$
   (i) $Na_2CO_3$
   (j) KSH
   (k) $(CH_3)_3COK$, and
   (l) mixtures thereof.

6. The process of claim 5 wherein the reaction is carried out at a pressure of between about 100 and about 2,000 p.s.i.g.

7. The process of claim 6 wherein said aromatic nitro compound is selected from the group consisting of nitrobenzene, 2-nitrotoluene, 3-nitrotoluene, 4-nitrotoluene, paramethoxynitrobenzene, 3-chloronitrobenzene, and mixtures thereof.

8. The process of claim 7 wherein the proportion of said sulfur compound of carbon is in the range between about 0.1 and about 50 moles of said sulfur compound of carbon per mole of nitro groups in said aromatic nitro compound.

9. The process of claim 8 wherein said sulfur containing-compound of carbon is carbon disulfide.

10. The process of claim 9 wherein said aromatic nitro compound is nitrobenzene.

11. The process of claim 10 wherein said base is sodium hydroxide.

12. The process of claim 10 wherein said base is potassium hydroxide.

13. The process of claim 10 wherein said base is potassium carbonate.

14. The process of claim 10 wherein said base is sodium methoxide.

15. The process of claim 10 wherein said base is potassium tertiary butyloxide.

16. The process of claim 10 wherein said base is sodium phenoxide.

17. The process of claim 10 wherein said base is sodium hydrosulfide.

18. The process of claim 10 wherein said base is sodium methylmercaptate.

19. The process of claim 10 wherein said base is sodium thiophenolate.

20. The process of claim 9 wherein said base is sodium hydroxide.

21. The process of claim 20 wherein said aromatic compound is 2-nitrotoluene.

22. The process of claim 20 wherein said aromatic compound is 3-nitrotoluene.

23. The process of claim 20 wherein said aromatic compound is 4-nitrotoluene.

24. The process of claim 20 wherein said aromatic compound is p-methoxynitrobenzene.

25. The process of claim 20 wherein said aromatic compound is 3-chloronitrobenzene.

References Cited

UNITED STATES PATENTS 2,711,421   6/1955   Mull _____ 260—552 X

FOREIGN PATENTS 475,477   12/1926   Germany _____ 260—552

OTHER REFERENCES

E. B. Veideman et al., Chemical Abstracts, vol. 54, cols. 8413–8414 (1960).

Schroeder, Chemical Reviews, vol. 55, pp. 191-2 (1955).

Houben-Weyl, Methoden der Organischen Chemie, band IX, George Thieme Verlag, Stuttgart, Germany, pp. 811–812 (1955).

LEON ZITVER, Primary Examiner

M. W. GLYNN, Assistant Examiner

U.S. Cl. X.R.

260—465 E